Jan. 21, 1947. A. F. WILSON 2,414,624
APPARATUS FOR TESTING TRANSMISSION LINES
Filed May 15, 1943
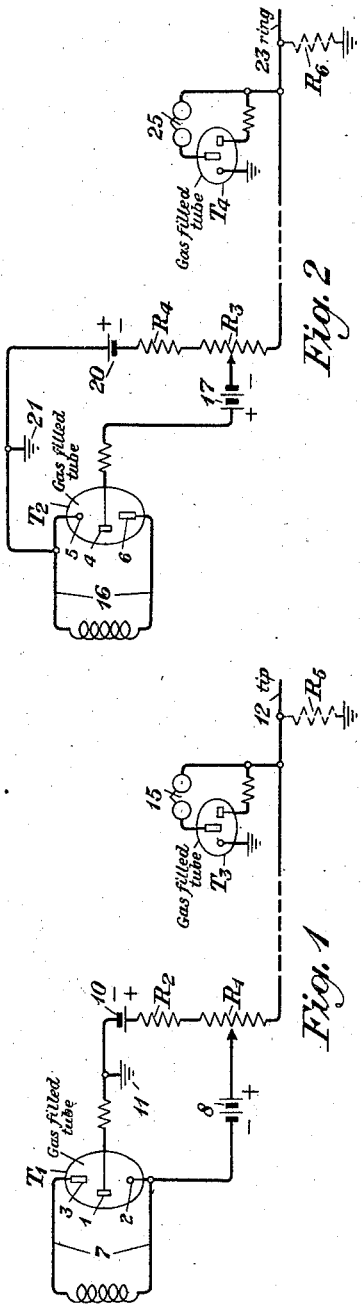
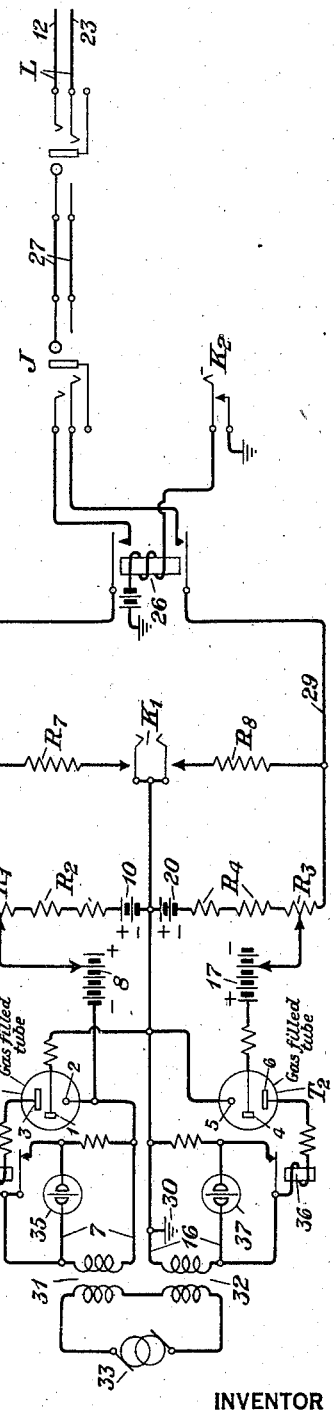
INVENTOR
*A. F. Wilson*
BY
*Ralph W. Wolf*
ATTORNEY Patented Jan. 21, 1947

2,414,624

UNITED STATES PATENT OFFICE 2,414,624

APPARATUS FOR TESTING TRANSMISSION LINES

Austin Fisher Wilson, Brooklyn, N. Y., assignor to American Telephone and Telegraph Company, a corporation of New York Application May 15, 1943, Serial No. 487,096

5 Claims. (Cl. 179—175.3)

This invention relates to transmission systems such, for example, as telephone systems, and more particularly to arrangements for making tests on the lines of such systems.

It has been known that a certain so-called insulation resistance exists between a transmission line, such as a telephone line or cable, and ground, and that this resistance will vary due to weather conditions or variations in the insulation of the line or other causes. A variation in the insulation resistance between such a line or cable and ground beyond certain limits is apt to interfere with the transmission of signals thereover. Accordingly in the maintenance of such lines it is desirable to make periodic tests to determine whether the insulation resistance between such lines and ground has varied beyond desirable limits. It is also desirable to make periodic tests to determine whether the conductors of a line have become grounded or short-circuited to each other. It is one of the objects of this invention to provide an arrangement for rapidly and accurately making such tests. Another object of the invention is to provide arrangements for making such tests which will be suitable for use on a plurality of different types of lines, including multiparty lines, without causing any interference with signaling apparatus associated with said lines. Other objects and features of the invention will appear more fully in the detailed description thereof hereinafter given.

In the past certain types of devices for testing lines have been provided which utilized a plurality of normally inert gas-filled discharge tubes. When circuit arrangements associated with these tubes were connected to the line to be tested, these tubes would remain inert if the condition of the line was satisfactory, but would break down and operate an alarm, if the condition of the line was unsatisfactory due, for example, to a poor insulation resistance, a ground or a short circuit. A testing device of this character may be found in an application, Serial No. 436,011, filed March 24, 1942, now Patent No. 2,367,013, dated Jan. 9, 1945, in the name of R. M. Edmonds. While testing devices of this character may operate satisfactorily on certain types of lines, nevertheless when connected to certain other types of lines, they may cause interference with signaling apparatus at the stations associated with such lines. For example, a multiparty telephone line may have a plurality of stations connected thereto each of which would have signaling devices connected through the medium of a gas-filled discharge tube between one side of the line and ground. If a testing device of the type disclosed in the aforementioned application were connected to such a line, the full voltage of the battery associated with the gas-filled tube in the testing set would be applied to the line and might cause the gas-filled tube associated with the signaling devices at the station to discharge and operate said signaling device falsely. The arrangements of the invention utilize two gas-filled tubes which are caused to discharge when the condition of the line is faulty. However, the circuit arrangements of the gas-filled tubes of the invention are so arranged that they can be connected to many different types of lines, particularly to multiparty lines, without causing any interference with or false operation of signaling apparatus at the stations on such lines.

The invention may be more fully understood from the following description together with the accompanying drawing in the Figures 1, 2 and 3 of which the invention is illustrated. Figs. 1 and 2 show schematically the principles of the operation of the invention. Fig. 3 is a more detailed circuit diagram of the testing set of the invention. Similar reference characters have been utilized to denote like parts in all of the figures.

As heretofore pointed out, this invention utilizes two normally inert gas-filled discharge tubes. One of these may be connected to the tip conductor and the other to the ring conductor of the line. A faulty condition on either conductor will cause the tube connected thereto to break down and cause an alarm. A short circuit from one conductor to another will cause both tubes to break down. In Figs. 1 and 2 are shown schematically how each tube is connected for testing purposes to each side of the line.

In Fig. 1 is shown a gas-filled discharge tube $T_1$ having electrodes 1, 2 and 3. Electrodes 1 and 2 are the control electrodes, and electrodes 2 and 3 are connected to a work circuit 7 which may control an alarm (not shown). Control electrode 2 is connected to battery 8, and this is connected through a portion of resistance $R_1$ and through resistance $R_2$ to battery 10 which is connected to control electrode 1. A ground 11 is connected between battery 10 and control electrode 1. This arrangement may be connected to the tip conductor 12 of the line to be tested. The line may be a multiparty line and have a plurality of subscribers' sets connected thereto each of which, as is well known in the art, would have signaling devices, such as 15, connected from one or another sides of the line to ground through gas-filled discharge tubes, such as $T_3$. The insulation resistance between the tip conductor 12 of the line and ground is indicated in dotted lines as $R_5$. For purposes of illustration let it be assumed that the gas-filled tube $T_1$ has a breakdown voltage in the neighborhood of 75 volts. Let it be assumed that battery 8 is 90 volts and battery 10 is 22 volts. It is pointed out that the voltages of batteries 8 and 10 oppose each other. Accordingly if the insulation resistance $R_5$ is above a desired value and the tip conductor is not grounded, the net voltage applied across the control electrodes 1 and 2 of tube $T_1$ will be 90—22=68 volts, or below the breakdown voltage of the tube $T_1$. Accordingly if the insulation resistance $R_5$ is not faulty, and the tip conductor 12 is not grounded, the voltage normally applied to the control electrodes of tube $T_1$ is not sufficient to break it down, and it remains inert and the alarm controlled thereby does not operate. However, if the tip conductor 12 is grounded, or the insulation resistance $R_5$ falls below a certain desired value, the following circuit will be closed: from ground 11, battery 10, resistance $R_2$ and $R_1$, tip conductor 12, insulation resistance $R_5$ to ground. This will cause current to flow from battery 10 through resistance $R_2$ and $R_1$, and will cause a voltage drop to take place in resistance $R_2$ and the part of $R_1$ which will nullify a portion of the opposing effect of the voltage of battery 10 with respect to battery 8. Accordingly sufficient voltage from the 90-volt battery 8 will now be applied across the control electrodes 1 and 2 of tube $T_1$ to cause it to break down and operate an alarm. Let it be assumed for purposes of illustration that the gas-filled tube $T_3$ also has a breakdown voltage in the neighborhood of 75 volts. When the circuit arrangements of tube $T_1$ are connected to the tip conductor 12, the following circuit may be traced: from ground 11, control electrodes of tube $T_1$, 90-volt battery 8, tip conductor 12, control electrodes of tube $T_3$ to ground. From the foregoing it will be noted that both tubes $T_1$ and $T_3$ are connected in series with the 90-volt battery 8, when the circuit arrangements of tube $T_1$ are connected to the line. While the voltage of the battery 8 would be sufficient to break down either tube alone, it is obviously not sufficient to break down either one when they are both connected in series with the battery under the values assumed of battery voltage and tube breakdown voltage. Accordingly it will be seen that when the arrangements of the invention are connected to the tip conductor of the line, the voltage applied to the line thereby, in the case of a multiparty line especially, will not cause any interference with or false operation of signaling apparatus on the line.

In Fig. 2 is shown a gas-filled discharge tube $T_2$ having electrodes 4, 5 and 6. Electrodes 4 and 5 are the control electrodes, and electrodes 5 and 6 are connected to a work circuit 16 which may control an alarm (not shown). Control electrode 4 is connected to battery 17, and this is connected through a portion of resistance $R_3$ and through resistance $R_4$ to battery 20 which is connected to control electrode 5. A ground 21 is connected between battery 20 and control electrode 5. This arrangement may be connected to the ring conductor 23 of the line to be tested. The insulation resistance of the ring conductor is shown in dotted lines as $R_6$. On the multiparty line there is shown connected thereto a signaling device 25 which would be connected to ground through the gas-filled discharge tube $T_4$. For purposes of illustration let it be assumed that the gas-filled tube $T_2$ also has a breakdown voltage in the neighborhood of 75 volts, and that the gas-filled tube $T_4$ will have a similar breakdown voltage. Let it be assumed that battery 17 is 90 volts and battery 20 is 22 volts. The voltages of these batteries oppose each other. Accordingly if the insulation resistance $R_6$ is above a desired value and the ring conductor is not grounded, the net voltage applied across the control electrodes 4 and 5 of the tube $T_2$ will be 90—22=68 volts or below the breakdown voltage of tube $T_1$ and the tube $T_2$ will not operate. However, if the ring conductor is grounded, or the insulation resistance $R_6$ falls below a certain value, the following circuit will be closed: from ground 21, battery 20, resistances $R_4$ and $R_3$, ring conductor 23, insulation resistance $R_6$ to ground. This will cause current to flow from battery 20 through resistances $R_4$ and $R_3$ and will cause a voltage drop to take place in resistance $R_4$ and part of $R_3$ which will nullify a portion of the opposing effect of the voltage of battery 20 with respect to battery 17. Accordingly sufficient voltage from the 90-volt battery 17 will now be applied across the control electrodes 4 and 5 of the tube $T_2$ to cause it to break down and operate an alarm. When the circuit arrangements of tube $T_2$ are connected to the ring conductor 23 of the line, the following circuit may be traced: from ground 21, control electrodes of Tube $T_2$, battery 17, ring conductor 23, control electrodes of tube $T_4$ to ground. Again it will be seen that when the testing arrangements of the invention are connected to the ring side of the line that the tubes $T_2$ and $T_4$ will be connected in series with the 90-volt battery 17, and the voltage from battery 17, as in the case of the arrangements of Fig. 1, will not cause the tube $T_4$ to break down, and hence will cause no interference with or false operation of signaling apparatus on the line.

Under certain conditions the tip and ring conductors might be short-circuited. Let us assume, to illustrate this condition, that a connection exists between the tip conductor 12 of Fig. 1 and the ring conductor 23 of Fig. 2. A circuit may then be traced as follows: from ground 11 of Fig. 1, battery 10, resistances $R_2$ and $R_1$, tip conductor 12, over the short circuit between the tip and ring conductors, over ring conductor 23, resistances $R_3$ and $R_4$, battery 20 to ground 21 of Fig. 2. In this circuit the batteries 10 and 20 will be in a series-aiding condition. This will cause current to flow from battery 10, through resistances $R_2$ and $R_1$, and will cause current to flow from battery 20, through resistances $R_3$ and $R_4$, and will cause voltage drops to take place in said resistances which will nullify the opposing effect of the voltage of battery 10 with respect to battery 8, and will also nullify the opposing effect of the battery 20 with respect to battery 17. Under these conditions the amount of voltage from the battery 8 applied to the control electrodes of tube $T_1$ will be above its breakdown value, and the tube $T_1$ will operate, and the amount of voltage applied from battery 17 across the control electrodes of tube $T_2$ will be above the breakdown voltage of said tube and will cause it to operate. Accordingly when a short circuit exists between the tip and ring conductors of the line, both tubes $T_1$ and $T_2$ will operate and cause their respective alarms to function.

In Fig. 3 there is shown in greater detail the circuit arrangements of the testing set of this invention. As heretofore pointed out, similar reference characters have been used to denote like parts with respect to Figs. 1 and 2. Two gas-filled tubes T₁ and T₂ are provided, the tube T₁ being arranged to be connected over conductor 28 to the tip side of a line L to be tested, and the tube T₂ being arranged to be connected over the conductor 29 to the ring side of the line L to be tested. The tube T₁ has its control electrodes interconnected by means of batteries 8 and 10 and resistances R₁ and R₂, as in Fig. 1. The tube T₂ has its control electrodes interconnected by means of the batteries 17 and 20 and the resistances R₃ and R₄, as in Fig. 2. Instead of having separate grounds, such as 11 and 21 of Figs. 1 and 2, respectively, a common ground 30 is provided in Fig. 3. To connect the testing set to the line L to be tested a key K₂ will be operated which will cause the relay 26 to operate and connect conductors 28 and 29 to the tip and ring contacts of the jack J, respectively. A cord 27 may then be utilized to connect the tip and ring contacts of the jack J to the tip and ring contacts of the line L to be tested. When the test set is connected to the line, the tubes T₁ and T₂ function in the same manner as described with respect to Figs. 1 and 2. Connected to conductors 28 and 29 are the resistances R₇ and R₈. These may be bridged across conductors 28 and 29 by operating the key K₁. With the key K₁ operated and the key K₂ not operated, these resistances R₇ and R₈ may be used to simulate a connection to an actual line for purposes of calibration. The work circuit 7 of the tube T₁ terminates in a winding of a transformer 31. The other winding of this transformer is included in a circuit connected to an alternating source of current 33. The work circuit 16 of the tube T₂ includes the winding of a transformer 32, the other winding of which is included in the circuit including the source 33. Included in the work circuit 7 is a relay 34. When the tube T₁ breaks down, the relay 34 will operate and open a short circuit around the lamp 35 causing it to operate and give an alarm. Due to the fact that the source 33 is an alternating current source, the relay 34 will operate intermittently and thus cause the lamp 35 to give a flashing signal. In a similar manner there is provided in the work circuit 16 a relay 36 which, when the tube T breaks down, will operate and open a short circuit about the lamp 37 causing it to operate. The relay 36 will also operate intermittently and thus cause the lamp 37 to flash.

While the invention has been disclosed as embodied in certain specific forms which are deemed desirable, it is understood that it is capable of embodiment in many and other widely varied forms without departing from the spirit of the invention as defined by the appended claims.

What is claimed is:

1. Apparatus for testing a transmission line comprising a normally inert gas-filled discharge tube, a circuit interconnecting the two control electrodes of said tube, two sources of potential in said circuit, said sources of potential opposing each other, a resistance in said circuit between said sources of potential, and means for connecting said resistance directly to the line to be tested, the constants of said sources of potential and said resistance being such that the voltage drop across said resistance due to the insulation resistance of the line will cause the net voltage of both of said sources applied across the control electrodes of said tube when the insulation resistance of the line is above a desired value to be insufficient to cause said tube to break down, but when the insulation resistance of the line falls below said desired value to be sufficient to cause said tube to break down.

2. Apparatus for testing a multiparty transmission line which would have at each station connected thereto a signaling device operated by the breakdown of a gas-filled discharge tube connected between one side of the line and ground, said apparatus comprising a normally inert gas-filled discharge tube, a circuit interconnecting the control electrodes of said tube, a source of potential in said circuit, the amount of potential applied to said control electrodes from said source being determined by the insulation resistance of the line to be tested, and a ground so connected to said circuit that when said apparatus is connected to a line to be tested the gas-filled discharge tube connected at a station from one side of said line to ground will be connected in series with said normally inert gas-filled tube in said apparatus and the potential from said source will be insufficient to operate the gas-filled tube connected at a station from one side of the line to ground.

3. Apparatus for testing a transmission line comprising two normally inert gas-filled discharge tubes, each of said tubes having a circuit interconnecting its control electrodes, a set of opposing batteries in each of said circuits of such values that when the apparatus is not connected to a line to be tested the net voltage applied from each of said sets of batteries to the control electrodes of its respective tube will be below the breakdown voltage of the tube, means for connecting each of said circuits to different conductors of a line to be tested, and means in each of said circuits effective when the insulation resistance of the conductor connected to the circuit is unsatisfactory for increasing the net voltage applied from the set of batteries in the circuit to the control electrodes of the tube associated with the circuit to at least the breakdown voltage of the tube.

4. Apparatus for testing a multiparty transmission line which would have at each station connected thereto a signaling device operated by the breakdown of a gas-filled discharge tube between one of the conductors of the line and ground, said apparatus comprising two normally inert gas-filled discharge tubes, each of said tubes having a circuit interconnecting its control electrodes, a set of batteries in each of said circuits of such values that when the apparatus is not connected to a line to be tested the net voltage applied from each of said sets of batteries to the control electrodes of its respective tube will be below the breakdown voltage of the tube, means for connecting each of said circuits to different conductors of a line to be tested, and means in each of said circuits effective when the insulation resistance of the conductor connected to the circuit is unsatisfactory for increasing the net voltage applied from the set of batteries in the circuit to the control electrodes of the tube associated with the circuit to at least the breakdown voltage of the tube, each of said circuits being so arranged that when either circuit is connected to a conductor of a line to be tested, the gas-filled discharge tube connected to said conductor at the station will be connected in series with the gas-filled discharge tube associated with the circuit connected to the conductor.

5. Apparatus for testing a transmission line comprising a gas-filled discharge tube, a circuit interconnecting the control electrodes of said tube, said circuit including in the following sequence a battery connected to one control electrode, a first resistance, a second resistance, a second battery connected to the other control electrode of a smaller but opposing voltage to said first battery and a ground between said second battery and the control electrode connected thereto, the net voltage applied from said batteries being normally below the breakdown voltage of the tube, and means to connect a portion of said first resistance to a conductor of a line to be tested.

AUSTIN F. WILSON.